US008254837B2

(12) United States Patent
Tian et al.

(10) Patent No.: US 8,254,837 B2
(45) Date of Patent: Aug. 28, 2012

(54) ESTABLISHING FULL-DUPLEX AUDIO OVER AN ASYNCHRONOUS BLUETOOTH LINK

(75) Inventors: Jun Tian, Grayslake, IL (US); Arnold Sheynman, Northbrook, IL (US); Phan Dao Minh Truong, Lake Bluff, IL (US)

(73) Assignee: Motorola Mobility LLC, Libertyville, IL (US)

( * ) Notice: Subject to any disclaimer, the term of this patent is extended or adjusted under 35 U.S.C. 154(b) by 570 days.

(21) Appl. No.: 12/428,642

(22) Filed: Apr. 23, 2009

(65) Prior Publication Data

US 2010/0273417 A1  Oct. 28, 2010

(51) Int. Cl.
  *H04B 7/00*  (2006.01)
  *H04B 5/00*  (2006.01)
(52) U.S. Cl. .................................. 455/41.2; 455/41.1
(58) Field of Classification Search .............. 455/41.1, 455/41.2, 41.3, 556.1, 569.1
  See application file for complete search history.

(56) References Cited

U.S. PATENT DOCUMENTS

| 2004/0264433 | A1 | 12/2004 | Melpignano |
| 2005/0286466 | A1 | 12/2005 | Tagg et al. |
| 2006/0194538 | A1 | 8/2006 | Palin et al. |
| 2007/0049196 | A1* | 3/2007 | Hillyard et al. ............... 455/41.2 |

FOREIGN PATENT DOCUMENTS

| EP | 1355469 A1 | 10/2003 |
| GB | 2411796 A | 9/2005 |

OTHER PUBLICATIONS

Bluetooth SIG, Inc., "Personal Area Networking Profile", http://bluetooth.com/Bluetooth/Technology/Works/PAN.htm, printed Aug. 28, 2008, pp. 1-2.
Shuchi Chawla, et al., "QoS Based Scheduling for Incorporating Variable Rate Coded Voice in Bluetooth", 2001, pp. 1232-1237, IEEE 00936884, Delhi, India.
Yunxin Liu, et al., "A Priority-Based MAC Scheduling Algorithm Enhancing QoS Support in Bluetooth Piconet", 2002, pp. 544-548, IEEE 01180678, Microsoft Research Asia, Beijing, China.
David Famolari and Farooq Anjum, "Improving Simultaneous Voice and Data Performance in Bluetooth Systems", 2002, pp. 1810-1814, IEEE01188511, Morristown, New Jersey, USA.

(Continued)

*Primary Examiner* — Robert Pascal
*Assistant Examiner* — Khiem Nguyen
(74) *Attorney, Agent, or Firm* — Sylvia Chen

(57) ABSTRACT

A method to establish a full-duplex audio connection over an asynchronous Bluetooth link between an audio terminal and a wireless audio device exchanges supported service classes and codecs between the audio terminal and the wireless audio device, negotiates a service class and a codec that are common to the audio terminal and the wireless audio device, and establishes an asynchronous audio connection between the audio terminal and the wireless audio device using the common service class and the codec. The audio connection established can depend on the software application desiring the audio connection plus the available service classes and codecs at the audio terminal and wireless audio device. For non-internet protocol (non-IP) audio applications, an ACL using AVDTP may be selected; for IP audio applications, an ACL using BNEP may be selected. Both AVDTP and BNEP can use codecs that support wide bandwidth audio.

21 Claims, 9 Drawing Sheets

OTHER PUBLICATIONS

S. Zeadally and A. Kumar, "Protocol Support for Audio Streaming between Bluetooth Devices", 2004, pp. 303-306, IEEE01389136, Detroit, Michigan, USA.

Bluetooth SIG, Inc., "Advanced Audio Distribution Profile (A2DP)", http://bluetooth.com/Bluetooth/Technology/Works/A2DP.htm, printed Aug. 28, 2008, pp. 1-2.

Bluetooth SIG, Inc., "Hands-Free Profile (HFP)", http://bluetooth.com/Bluetooth/Technology/Works/HFP.htm, printed Aug. 28, 2008, pp. 1-2.

Bluetooth SIG, Inc., "Headset Profile (HSP)", http://bluetooth.com/Bluetooth/Technology/Works/HSP.htm, printed Jan. 23, 2009, pp. 1-2.

Bluebooth SIG, Inc., "Intercom Profile (ICP)", http://bluetooth.com/Bluetooth/Technology/Works/ICP.htm, printed Jan. 23, 2009, pp. 1-2.

Bluetooth SIG, Inc., "Cordless Telephony Profile (CTP)", http://bluetooth.com/Bluetooth/Technology/Works/CTP.htm, printed Jan. 23, 2009, pp. 1-2.

Bluetooth SIG, Inc., "Change Request: Wide-Band Speech in the Hands Free Profile", Feb. 15, 2008, pp. 1-111.

Bluetooth SIG, Inc., "Profile ICS Proforma for Hands Free Profile Specification 1.5 (HFP 1.5) Change Request: Wide-Band Speech in the Hands-Free Profile", Feb. 2008, pp. 1-14, HFP10.ICS/1.5.5r0, HFP15.ICS/1.5.5r0.

* cited by examiner

500                SERVICE RECORD FOR THE AUDIO GATEWAY (AG)    590

| ITEM | DEFINITION | TYPE | VALUE | STATUS | DEFAULT |
|---|---|---|---|---|---|
| ServiceClassIDList | 510 | | | M | |
| ServiceClass0 | 512 | UUID | AG ENHANCED HANDS-FREE | M | |
| ServiceClass1 | 514 | UUID | GENERIC AUDIO | M | |
| ServiceClass2 | 516 | UUID | VoAVDTP | C1 | |
| ServiceClass3 | 518 | UUID | VoBNEP | C2 | |
| ProtocolDescriptorList | 520 | | | M | |
| Protocol0 | 522 | UUID | L2CAP | M | |
| Protocol1 | 524 | UUID | RFCOMM | M | |
| ProtocolSpecificParameter0 | SERVER CHANNEL | Uint8 | N = SERVER CHANNEL # | M | |
| BluetoothProfileDescriptorList | 526 / 530 | | | M | |
| Profile0 | SUPPORTED PROFILES | UUID | ENHANCED HANDS-FREE | M | ENHANCED HANDS-FREE |
| Param0 | 532 PROFILE VERSION | Uint16 | 0x0TBD | M | |
| BluetoothSupportedCodecList | 536 / 540 | | | C1 or C2 | |
| Codec0 | 542 | UUID | SBC | C1 or C2 | |
| Codec1 | 544 | UUID | iLBC | C2 or C1 | |
| Codec2 | 546 | UUID | CVSD | C1 or C2 | |
| Codec3 | 548 | UUID | AMR-WB | C1 or C2 | |
| ServiceName | DISPLAY-ABLE TEXT NAME | STRING | SERVICE-PROVIDER DEFINED | M | "VOICE GATEWAY" |
| NETWORK | 560 / 570 | Uint8 | 0x01 - ABILITY TO REJECT A CALL 0x00 - NO ABILITY TO REJECT A CALL | M | |
| SupportedFeatures | FEATURES SUPPORTED | Uint16 | DEVICE DEPENDENT | M | 0x0000 |

*600* SERVICE RECORD FOR THE HANDS - FREE UNIT (HF) *690*

| ITEM | DEFINITION | TYPE | VALUE | STATUS | DEFAULT |
|---|---|---|---|---|---|
| ServiceClassIDList | 610 | | | M | |
| ServiceClass0 | 612 | UUID | HF ENHANCED HANDS-FREE | M | |
| ServiceClass1 | 614 | UUID | GENERIC AUDIO | M | |
| ServiceClass2 | 616 | UUID | VoAVDTP | C1 | |
| ServiceClass3 | 618 | UUID | VoBNEP | C2 | |
| ProtocolDescriptorList | 620 | | | M | |
| Protocol0 | 622 | UUID | L2CAP | M | |
| Protocol1 | 624 | UUID | RFCOMM | M | |
| ProtocolSpecificParameter0 | SERVER CHANNEL | Uint8 | N = SERVER CHANNEL # | M | |
| BluetoothProfileDescriptorList | 626 / 630 | | | M | |
| Profile0 | SUPPORTED PROFILES | UUID | ENHANCED HANDS-FREE | M | ENHANCED HANDS-FREE |
| Param0 | 632 PROFILE VERSION | Uint16 | 0x0TBD | M | |
| BluetoothSupportedCodecList | 636 / 640 | | | C1 or C2 | |
| Codec0 | 642 | UUID | SBC | C1 or C2 | |
| Codec1 | 644 | UUID | iLBC | C2 or C1 | |
| Codec2 | 646 | UUID | CVSD | C1 or C2 | |
| Codec3 | 648 | UUID | MPEG2-AUDIO | C1 or C2 | |
| Codec4 | 652 | UUID | MPEG2-AAC | C1 or C2 | |
| Codec5 | 654 / 660 | UUID | MPEG2-AAC | C1 or C2 | |
| ServiceName | DISPLAY-ABLE TEXT NAME | STRING | SERVICE-PROVIDER DEFINED | M | "HANDS-FREE UNIT" |
| SupportedFeatures | FEATURES SUPPORTED | Uint16 | DEVICE DEPENDENT | M | 0x0000 |

ESTABLISHING FULL-DUPLEX AUDIO OVER AN ASYNCHRONOUS BLUETOOTH LINK

FIELD OF THE DISCLOSURE

This disclosure relates generally to establishing voice communication over a wireless asynchronous channel, and more specifically to establishing a full-duplex wideband audio connection over Bluetooth asynchronous links.

BACKGROUND OF THE DISCLOSURE

Bluetooth supports two types of transports: synchronous connection oriented (SCO) transports and asynchronous connectionless link (ACL) transports. Bluetooth profiles that require a full-duplex, low latency voice link, such as the Hands-Free Profile (HFP), require an SCO transport between an audio gateway (AG), such as a mobile phone, and a Hands-Free Unit (IF), such as a simple headset or a hands-free unit installed in a car. (Other profiles that require a full-duplex voice link include the Headset Profile (HSP), the Cordless Telephony Profile (CTP), and the Intercom Profile (ICP).)

The HFP uses the SCO transport and a Continuously Variable Slope Delta Modulation (CVSD) codec to stream full-duplex narrow bandwidth (8 kHz sampling rate) voice between the AG and HF. The SCO transport also requires periodic allocation of a pair of slots once every 2, 4, or 6 slots. The SCO transport does not include a retransmission mechanism and is based on a fixed scheduling. Thus, when in the presence of an interfering synchronous signal (e.g., LTE, WiMAX, or WCDMA operating at the 2.5 GHz band while Bluetooth is operating at the 2.4 GHz band), packet losses over SCO links due to adjacent channel interference and receiver de-sense may be as high as 25% on the downlink (AG to HF) and 38% on the uplink (HF to AG). Enhanced SCO (eSCO) enables limited retransmissions and a wider variety of packet types, but eSCO has the same fixed scheduling as SCO which can be extremely detrimental in the presence of certain types of interference.

The other type of Bluetooth transport, ACL, is more reliable in interference conditions due to a retransmission mechanism. ACL, unlike SCO/eSCO, uses non-fixed scheduling. The Audio/Video Distribution Transport Protocol (AVDTP) is a transport protocol based on the ACL transport, and it is used by the Advanced Audio Distribution Profile (A2DP) of Bluetooth. A2DP uses AVDTP and a Sub-Band Codec (SBC) or other supported codec to stream wide bandwidth (16 kHz or higher sampling rate) audio in one direction only—from a source (SRC) to a sink (SNK). Another type of ACL transport protocol is Bluetooth Network Encapsulation Protocol (BNEP), which is required by the Personal Area Networking Profile (PAN) of Bluetooth. BNEP enables point-to-multipoint IP-based communication over an ACL transport.

There is an opportunity to establish a Voice over ACL (VoACL) link for streaming full-duplex wide bandwidth voice using Bluetooth. This would enable the use of a wide range of frame-based codecs such as an Adaptive Multi Rate-Wideband (AMR-WB) codec, an internet Low Bitrate Codec (iLBC), a Speex codec, and others. SCO links only support Continuously Variable Slope Delta Modulation (CVSD) and Pulse Code Modulation (PCM) codecs, which require a high bandwidth although these codecs only provide mediocre audio quality. Establishing a Bluetooth VoACL transport may also help mitigate some negative effects of coexistence of Bluetooth with technologies such as LTE, WiMAX, and WCDMA. Flexibility in scheduling of ACL traffic enables a controller to try to minimize collisions by scheduling Bluetooth packets in-between the transmissions of interfering technologies. Additionally, the retransmission mechanisms existing in Bluetooth ACLs may reduce packet losses. The various aspects, features and advantages of the disclosure will become more fully apparent to those having ordinary skill in the art upon careful consideration of the following Drawings and accompanying Detailed Description.

BRIEF DESCRIPTION OF THE DRAWINGS

FIG. 5 shows an example service record for an AG in accordance with an embodiment.

FIG. 6 shows an example service record for an HF in accordance with an embodiment.

DETAILED DESCRIPTION

A method to establish a full-duplex audio connection over an asynchronous Bluetooth link between an audio terminal and a wireless audio device exchanges supported service classes and codecs between the audio terminal and the wireless audio device, negotiates a service class and a codec that are common to the audio terminal and the wireless audio device, and establishes an asynchronous audio connection between the audio terminal and the wireless audio device using the common service class and the codec. The full-duplex audio connection that is established can depend on the software application desiring the audio connection plus the available service classes and codecs at the audio terminal and wireless audio device. For non-internet protocol (non-IP) audio applications, an asynchronous connectionless link (ACL) transport using Audio/Video Distribution Transport Protocol (AVDTP) as a transport protocol may be selected. For internet protocol (IP) audio applications, an ACL using Bluetooth Network Encapsulation Protocol (BNEP) as a transport protocol may be selected due to existing similarities in packet structure through the various protocol stack layers. Both AVDTP and BNEP have an advantage of being able to use codecs (such as SBC, AMR-WB, Speex, EVRC-WB, etc.) that support wide bandwidth audio, while the traditional CVSD codec only supports narrow bandwidth audio. Additionally, by providing alternatives to Bluetooth SCO, a full-duplex audio Bluetooth connection may be able to better coexist with another technology's synchronous connection.

Figure 1:
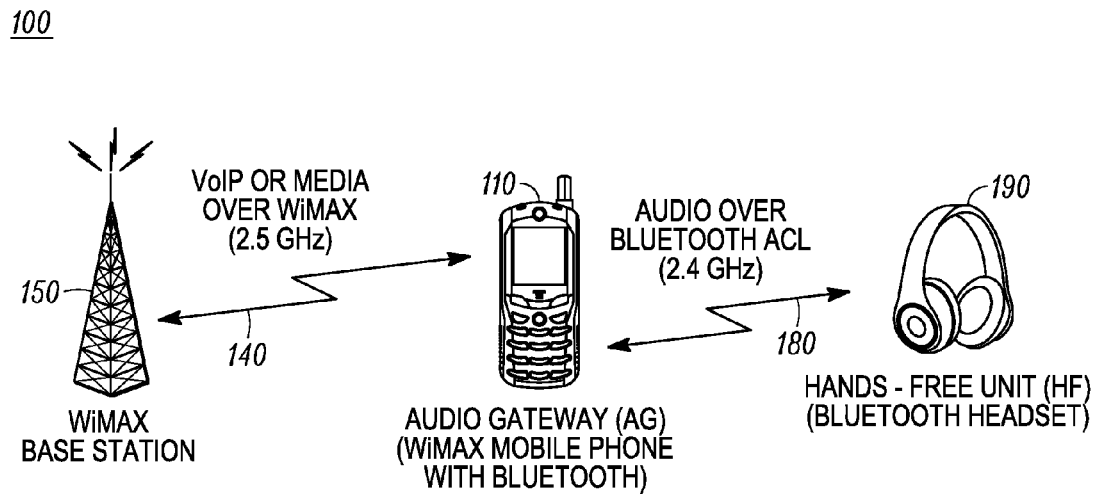
FIG. 1 shows an example scenario of coexistence of a Bluetooth ACL transport and a synchronous wireless technology.

FIG. 1 shows an example scenario 100 of coexistence of a Bluetooth ACL transport and a synchronous wireless technology. In this example, the synchronous wireless technology is WiMAX operating at the 2.5 GHz band and the Bluetooth ACL is operating at the 2.4 GHz band. Although WiMAX is shown here, LTE and WCDMA and other adjacent frequency band wireless communications can be substituted for WiMAX.

In this scenario 100, a mobile phone 110 has WiMAX radio with a wireless synchronous connection 140 to a WiMAX access point 150 (sometimes called a "WiMAX base station") and the mobile phone 110 simultaneously has a Bluetooth radio with a wireless asynchronous connection 180 to a Bluetooth headset 190. The asynchronous connection 180 uses a Bluetooth ACL transport, which supports flexible packet scheduling Thus, even in the presence of interference caused by an active WiMAX connection 140, the Bluetooth connection 180 can provide performance acceptable to a user.

In this scenario 100, which is governed by an enhanced Bluetooth Hands-Free Profile (eHEP), the mobile phone 110 acts as an audio gateway (AG) and the headset 190 acts as a hands-free unit (HF). The audio over Bluetooth ACL connection 180 can be wide bandwidth (16 kHz sampling rate) or narrow bandwidth (8 kHZ sampling rate). With the stereo Bluetooth headset 190 shown, the audio is preferably wide bandwidth. Other profiles, such as HSP, CTF, and ICP, can be implemented using audio over Bluetooth ACL in conformance with the teachings in this patent application.

Figure 2:
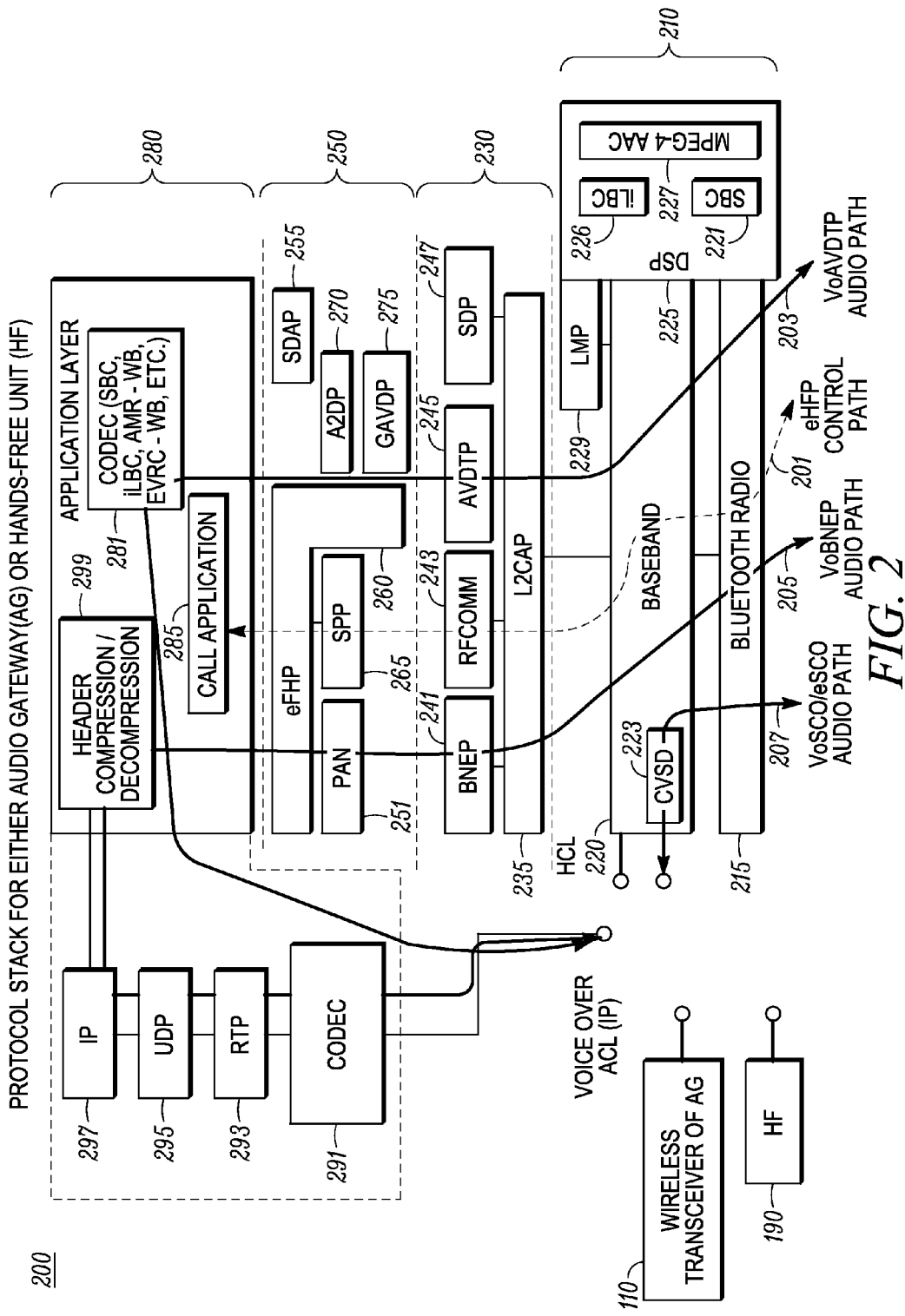
FIG. 2 shows an example protocol stack for Bluetooth Voice over BNEP and Bluetooth Voice over AVDTP in accordance with an embodiment.

FIG. 2 shows an example protocol stack 200 for Bluetooth Voice over BNEP and Bluetooth Voice over AVDTP in accordance with an embodiment. As mentioned previously, BNAP and AVDTP are two transport protocols based on the ACL transport. This protocol stack 200 is applicable to either an AG or an HF, or both. (See FIG. 1 for mobile phone 110 as an example AG and Bluetooth headset 190 as an example HF.) There are two possible audio paths for audio over Bluetooth ACL. One possibility is a VoAVDTP audio path 203 using an AVDTP transport protocol, and the other possibility is a VoBNEP audio path 205 using a BNEP transport protocol. It is possible to have variations on the audio paths 203, 205 shown (e.g., using alternate codecs) as well as alternate audio paths using alternate transport protocols, such as a standard Voice over SCO/eSCO audio path 207.

At protocol stack layer 1 210 is the Bluetooth radio protocol 215 and a baseband protocol 220 with a digital signal processor (DSP) 225 implementing one or more codecs such as a low complexity Sub-Band Codec (SBC) 221 designed for wideband audio, a Continuously Variable Slope Delta Modulation (CVSD) codec 223 traditionally used for narrowband speech, an internet Low Bit rate Codec (iLBC) 226 supporting narrowband speech, and an MPEG-4 AAC codec 227 supporting wideband audio. Of course, additional, fewer, and/or alternate codecs such as an adaptive multi-rate wideband (AMR-WB) codec, an enhanced variable rate wideband (EVRC-WB) codec, etc., could be implemented in the protocol stack of either the AG or the HF. Also, the codecs available in the AG do not have to match the codecs available in the HF; however, at least one matching codec is assumed due to the requirements of the Bluetooth HFP, A2DP, and PAN profiles. Additionally, a link manager protocol (LMP) 229 interfaces between the baseband protocol 220 and protocol stack layer 2 230 through a host controller interface (HCI).

Protocol stack layer 2 230 includes a Logical Link Control and Adaptation Layer Protocol (L2CAP) 235 and one or more layer 2 protocols above the L2CAP 235 such as BNEP 241, Radio Frequency Communication (RFCOMM) 243, AVIDTP 245, and Bluetooth Service Discovery Protocol (SDP) 247. Depending on the Bluetooth device, more or fewer layer 2 protocols can be implemented or substituted on top of the L2CAP 235. For example, a generic Object Exchange (OBEX) profile could also be implemented at protocol stack layer 230.

Protocol stack layer 3 250 includes one or more Bluetooth profiles such as a Personal Area Networking Profile (PAN) lnposelstart251lnposelend, an enhanced Hands-Free Profile (eHFP) 260, a Serial Port Profile (SPP) 265, an A2DP 270, a Generic Audio/Video Distribution Profile (GAVDP) 275, and a Service Discovery Application Profile (SDAP) 255.

An application layer 280 includes a call application 285 and various voice over internet protocol (VoIP) layers such as audio codec 291 implemented on a host processor, real-time transport protocol (RTP) 293, user datagram protocol (UDP) 295, internet protocol (IP) 297, plus header compression/decompression 299. The codec 291 could be implemented as one or more of: an SEC, an iLBC, an adaptive multi-rate wideband (AMR-WB) codec, an enhanced variable rate wideband (EVRC-WB) codec, and other type of codec. The codec 291 could be a collection of codecs.

An eHFP control signal path 201 supports full-duplex audio communication (e.g., voice) over Bluetooth asynchronous channels. Two audio paths 203, 205 are shown, and their selection depends on the eHFP connection set-up, which will be described with respect to further drawings. A Voice over AVDTP (VoAVDTP) audio path 203 uses the Audio/Video Distribution Transport Protocol, which includes mandatory support for the SEC implemented in either a host processor codec 281, 291 or a baseband DSP 225. Voice over BNEP audio path 205 is an alternate audio path to the VoAVDTP audio path 203. The choice of the audio paths for the VoACL will depend on application layer 280 factors such as whether the audio path is coming from a VoIP connection (in which case a VoBNEP audio path 205 may be selected due to existing similarities in packet structure through the various protocol stack layers) or whether the audio path is coming from a non-VoIP connection (in which case a VoAVDTP audio path 203 may be selected due to less (protocol layer encapsulation) overhead, less computational complexity, lower latency, and more efficient use of air interface resources. In the future, other audio paths may be supported through existing or new protocol stack layer 3 250 profiles, protocol stack layer 2 230 transport protocols, and/or protocol stack layer 1 210 codecs.

Figure 3:
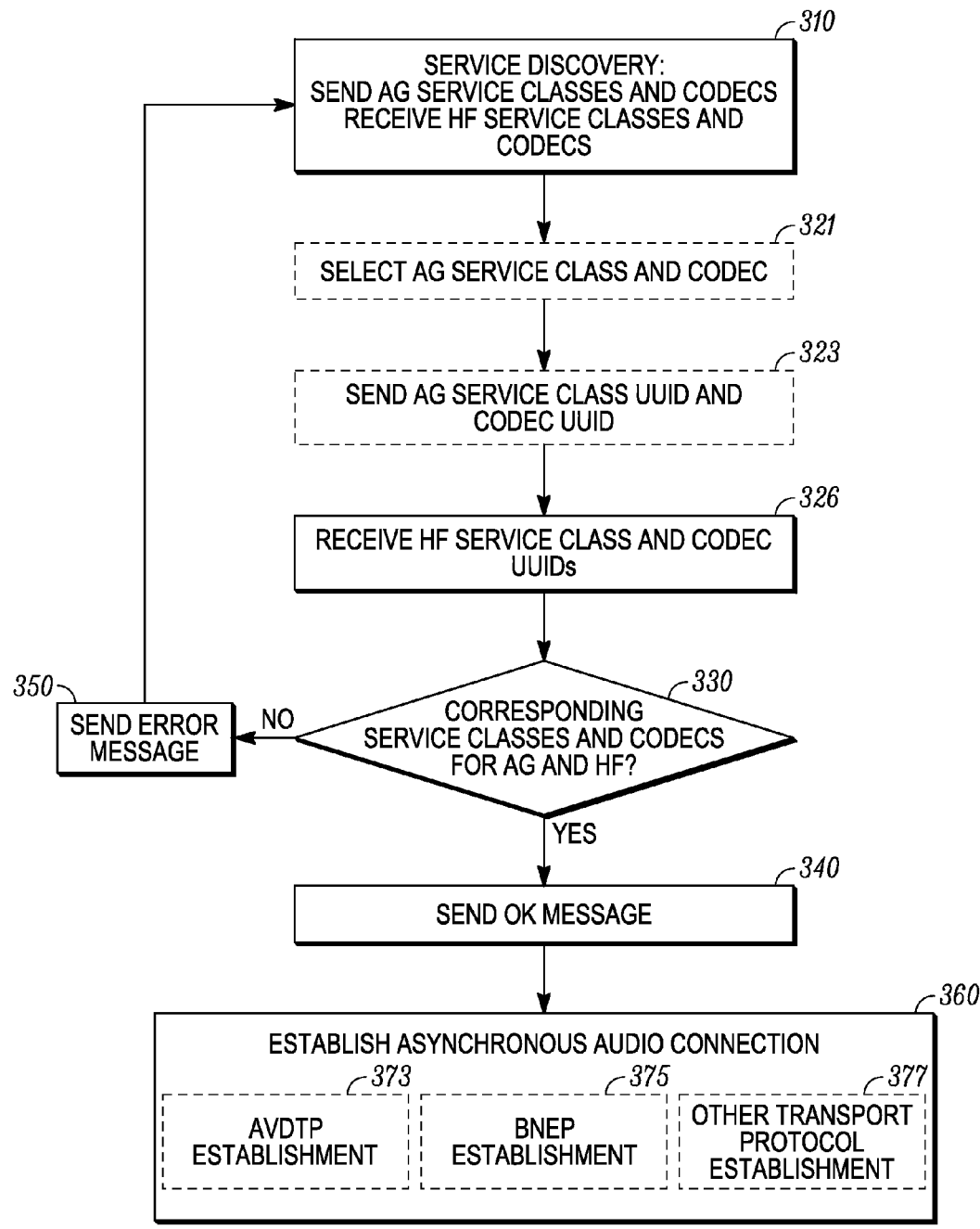
FIG. 3 shows a flow diagram of connection set-up by an audio gateway (AG) for a Bluetooth Voice over ACL transport in accordance with an embodiment.

FIG. 3 shows a flow diagram 300 of connection set-up by an audio gateway (AG) for a Bluetooth Voice over ACL transport in accordance with an embodiment. An example of an AG is shown in FIG. 1 as mobile phone 110.

Initially, the AG undergoes service discovery 310 where the AG looks for and exchanges information with an HF (such as Bluetooth headset 190 shown in FIG. 1). This service discovery 310 is substantially in accordance with the SDP 247 shown in FIG. 2 except that the service records for the AG and the HF can be enhanced as will be shown in FIGS. 5-6. Alternately, the service discovery can be performed using AT commands to exchange service class and codec capabilities.

When a user launches an application at the AG, the AG selects 321 a service class and a codec that (a) supports the launched application and (b) is common to both the AG and the HF as noted from the service records exchanged during service discovery 310. Next, the AG transmits 323 the UUID of the selected service class and the UUID of the selected codec to the HF using an AT command, or using AVDTP or another protocol. Note that this selection 321 and transmission 323 are not required if the user launches an application at the HF rather than the AG.

The AG receives 326 service class and codec UUIDs from the HF. If the AG transmitted 323 service class and codec UUICs, this reception 326 would be in response to the transmission 323. Otherwise, if the user launched an application at the HF, then the reception 326 would not have been in response to a transmission by the AG.

If the received service class and codec UUIDs from the HF correspond 330 to a service class and codec available at the AG, then the AG sends 340 an OK message to the HF using an AT command (or other protocol) and proceeds to establish 360 a Bluetooth asynchronous audio connection using the service class and codec agreed-upon. If the agreed-upon service class was VoAVDTP, then the AG establishes an AVDTP audio path 373. If the agreed-upon service class was VoBNEP, then the AG establishes a BNEP audio path 375. If another transport protocol was selected, than a different audio path 377 can be set up.

If the received service class and codec UUICs from the HF fail to correspond 330 to a service class and codec available at the AG, then the AG sends 350 an ERROR message to the HF using an AT command (or other protocol) and returns so that service discovery 310 can be re-performed.

Figure 4:
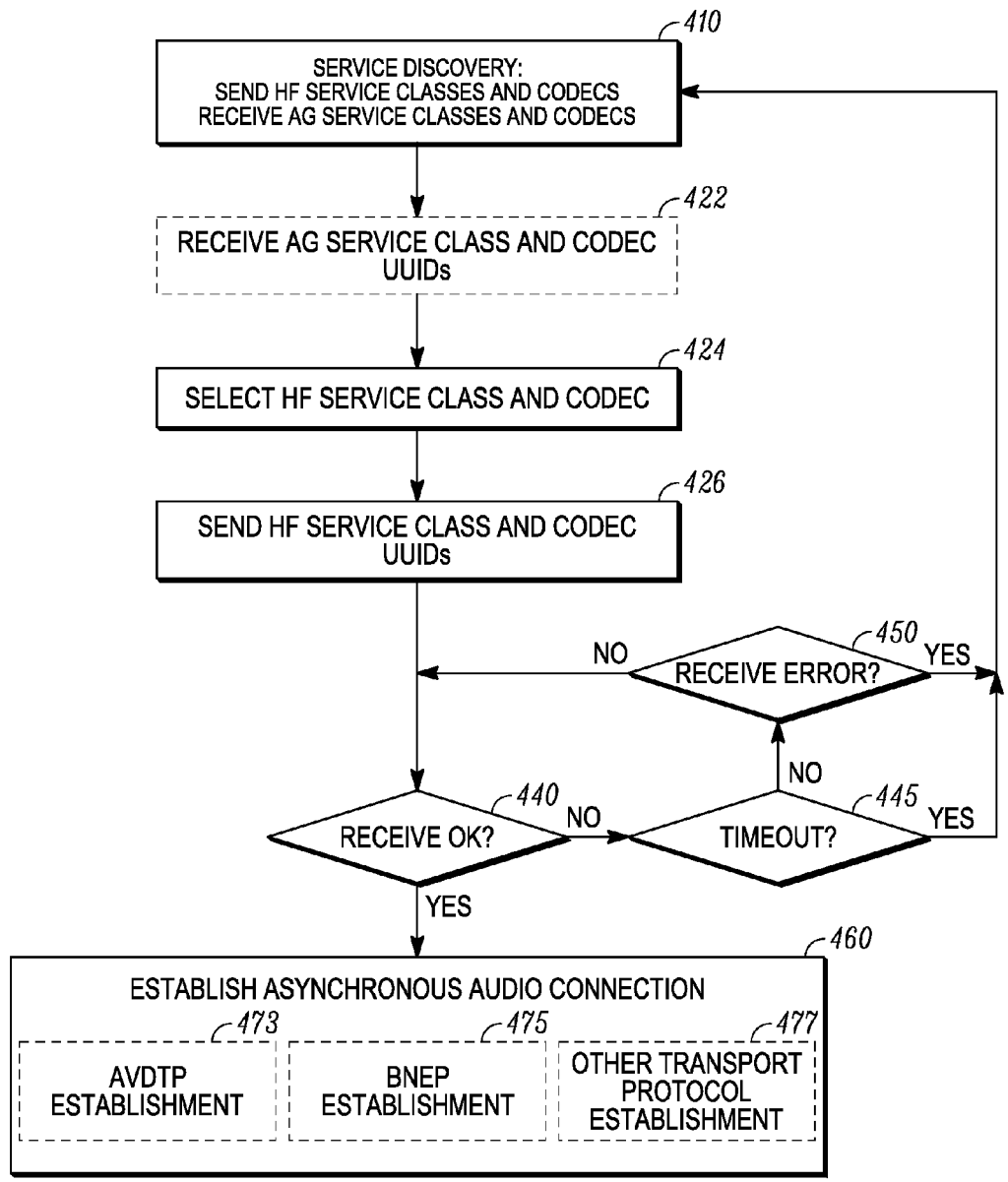
FIG. 4 shows a flow diagram of connection set-up by a Hands-Free Unit (HF) for a Bluetooth Voice over ACL transport in accordance with an embodiment.

FIG. 4 shows a flow diagram 400 of connection set-up by a Hands-Free Unit (HF) for a Bluetooth Voice over ACL transport in accordance with an embodiment. An example of an HF is shown in FIG. 1 as Bluetooth headset 190.

Initially, the HF undergoes service discovery 410 where the HF looks for and exchanges information with an AG (such as mobile phone 110 shown in FIG. 1). This service discovery 410 is substantially in accordance with the SDP 247 shown in FIG. 2 except that the service records for the AG and the HF can be enhanced as will be shown in FIGS. 5-6. Alternately, the service discovery can be performed using AT commands or AVDTP procedures to exchange service class and codec capabilities.

When a user launches an application at the AG, the AG will send a service class UUID and a codec UUID. The HF receives 422 the service class and codec UUIDs from the AG. If the HF supports a corresponding service class and codec, it selects 424 that matching service class and codec for the HF and sends 426 the UUIDs of the corresponding HF service class and codec.

If a user has launched an application at the HF, then the HF does not receive 422 AG service class and codec UUIDs. Instead, the HF selects a service class and codec from its own service record that supports the launched application and is also available at the AG as known through the exchange of service records during service discovery 410. After selection by the HF 424, the HF sends 426 the selected HF service class and codec to the AG using an AT command or using AVDTP or another protocol.

Next, the HF waits to receive an OK message 440 from the AG. If a timer determines that no timeout 445 has occurred and an ERROR message 450 has not been received, the HF continues to wait for an OK message. If an ERROR message 450 is received from the AG or the timeout 445 occurs, the flow returns to service discovery 410.

If an OK message 440 is received before the timeout period expires, then the HF establishes 460 a Bluetooth asynchronous audio connection using the service class and codec agreed-upon. If the agreed-upon service class was VoAVDTP, then the AG establishes an AVDTP audio path 473. If the agreed-upon service class was VoBNEP, then the AG establishes a BNEP audio path 475. If another transport protocol was selected, than a different audio path 477 can be set up.

FIG. 5 shows an example service record 500 for an AG in accordance with an embodiment. An example of an AG is shown in FIG. 1 as mobile phone 110. The service record 500 includes mandatory (Status field 590=M) records 510, 512, 514, 520, 522, 524, 526, 530, 532, 536, 560, 570, 580 as required by the Bluetooth HFP. In addition to the mandatory records, this service record 500 includes several additional service class records 516, 518 and Bluetooth Supported Codec ID List records 540, 542, 544, 546, 548. The Status held 590 for these additional service class records 516, 518 indicates at least one supporting codec in the AG. For example, Service Class 2 record 516 has a Status field 590 indicating C1. The codecs that support Service Class 2 are listed in Codec 0 record 542, Codec 1 record 544 (as a second choice), Codec 2 record 546, and Codec 3 record 548. Similarly, Service Class 3 record 518 has a Status field 590 record indicating C2. The codecs that support Service Class 3 are listed in Codec 0 record 542 (as a second choice), Codec 1 record 544, Codec 2 record 546 (as a second choice), and Codec 3 record 548 (as a second choice). Thus, the enhanced service record 500 for the AG can be used to set up and establish an asynchronous audio connection using a suitable service class and codec available to both the AG and the HY.

FIG. 6 shows an example service record 600 for an HF in accordance with an embodiment. An example of an HF is shown in FIG. 1 as Bluetooth headset 190. Similar to the AG service record 500, the HF service record 600 includes mandatory (Status field 690=M) records 610, 612, 614, 620, 622, 624, 626, 630, 632, 636, 660, 680 as required by the Bluetooth HFP. In addition to the mandatory records, this HF service record 600 includes several additional service class records 616, 618 and Bluetooth Supported Codec ID List records 640, 642, 644, 646, 648, 652, 654. The Status field 690 for these additional service class records 616, 618 indicate at least one supporting codec in the AC. For example, Service Class 2 record 616 has a Status field 690 indicating C1. The codecs that support Service Class 2 are listed in Codec 0 record 642, Codec 1 record 644 (as a second choice), Codec 2 record 646, Codec 3 record 648, Codec 4 record 652, and Codec 5 record 654. Similarly, Service Class 3 record 618 has a Status field 690 record indicating C2. All the codecs support Service Class 3 and are listed in Codec record 0 642 (as a second choice), Codec 1 record 644, Codec 2 record 646 (as a second choice), Codec 3 record 648 (as a second choice), Codec 4 record 652 (as a second choice), and Codec 5 record 654 (as a second choice). Thus, given knowledge of both AG and HF service records, an AG and an HF can set up and establish an asynchronous audio connection using a suitable service class and codec available to both the AG and the HF.

Although FIGS. 5-6 show the HF supporting more codecs than the AG, it is possible for the AG to support fewer, more, or an equal number of codecs than the HF.

Figure 7:
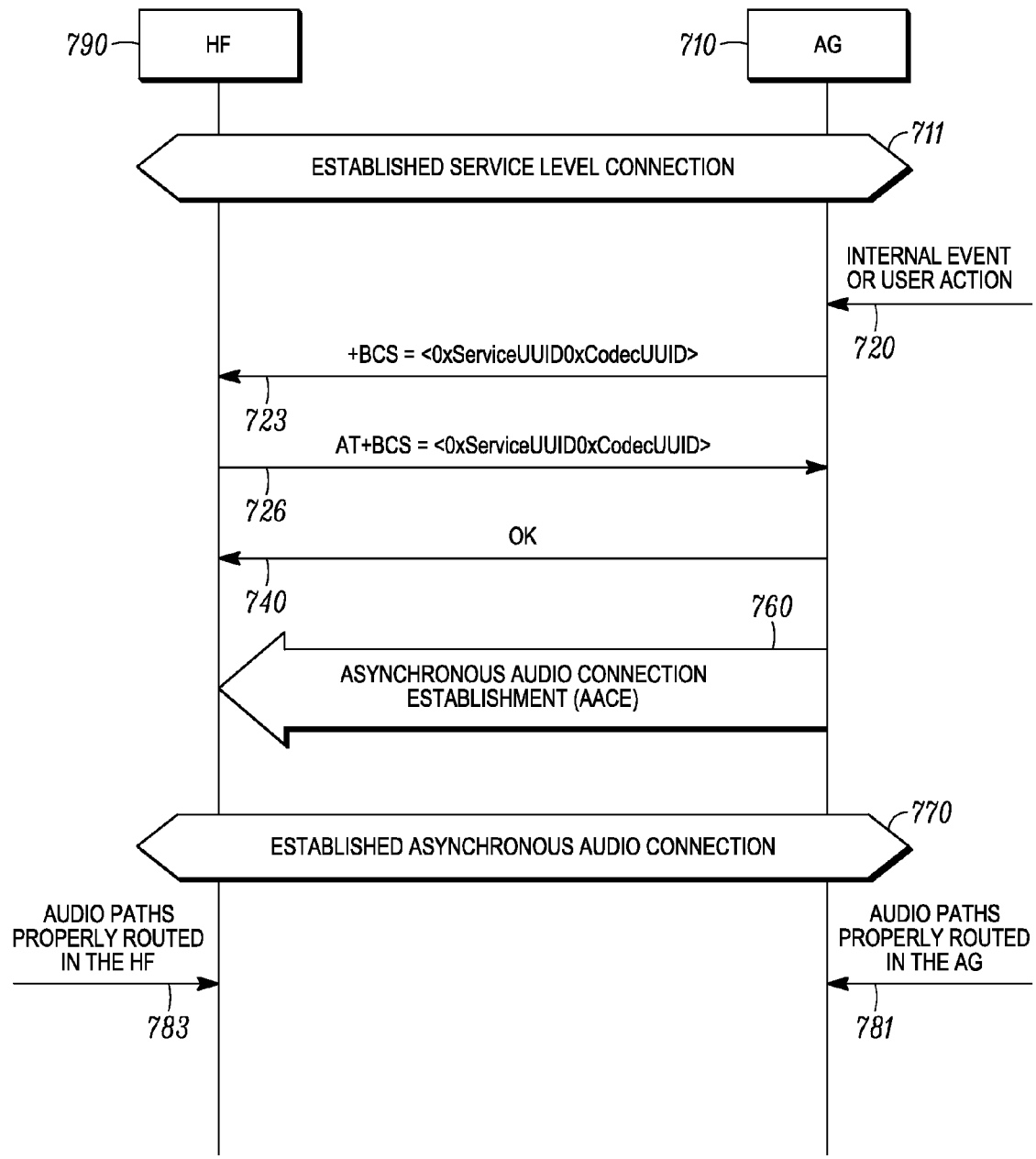
FIG. 7 shows a signal diagram of a connection set-up triggered by an AG for a Voice over ACL transport in accordance with an embodiment.

FIG. 7 shows a signal diagram 700 of a connection set-up triggered by an AG 710 for a Voice over ACL transport in accordance with an embodiment. Wireless signals travel between an AG 710 such as a mobile phone with Bluetooth radio and an HF 790 such as a Bluetooth headset.

During Bluetooth service discovery 711, the AG and HF exchange their respective service records (such as the example service records 500, 600 shown in FIGS. 5-6). An internal event or user action trigger 720 at the AG 710 causes the AG 710 to select a service class and codec appropriate to the trigger 720. Although triggers are implementation-specific, an example trigger is pressing a button on the AG 710 to initiate a hands-free VoIP phone call or receiving a phone call at the mobile phone 710 which triggers streaming of a wideband (e.g., stereo) ringtone to the HF 790.

The AG 710 sends the selected service class UUID and codec UUID in a Bluetooth Service & Codec Selection (+BSCS) message 723 which can be implemented using one or more AT commands. Assuming that the HF supports a corresponding service class and codec (which it should, because of the earlier-exchanged service records during service discovery 711), the HF responds with an AT+BSCS message 726 containing the UUIDs of the service classes and codecs selected by the HF, which should correspond to the UUIDs received in the +BSCS message 723. Assuming that the UUICs in the AT+BSCS message 726 match the UUICs in the BSCS message 723, the AG 710 sends an OK message 740 to the HF 790.

Next, the AG initiates an asynchronous audio connection establishment (AACE) 760. Both the AG and the HF user the selected service class and selected codec to establish their respective audio paths. (See FIG. 2.) When the audio paths are set up at the AG and HF, the asynchronous audio connection is established 770 and audio paths are properly routed in the HF 783 and in the AG 781. Thus, a full-duplex, wideband, asynchronous audio connection can be set up and established as triggered by an AG 710.

Figure 8:
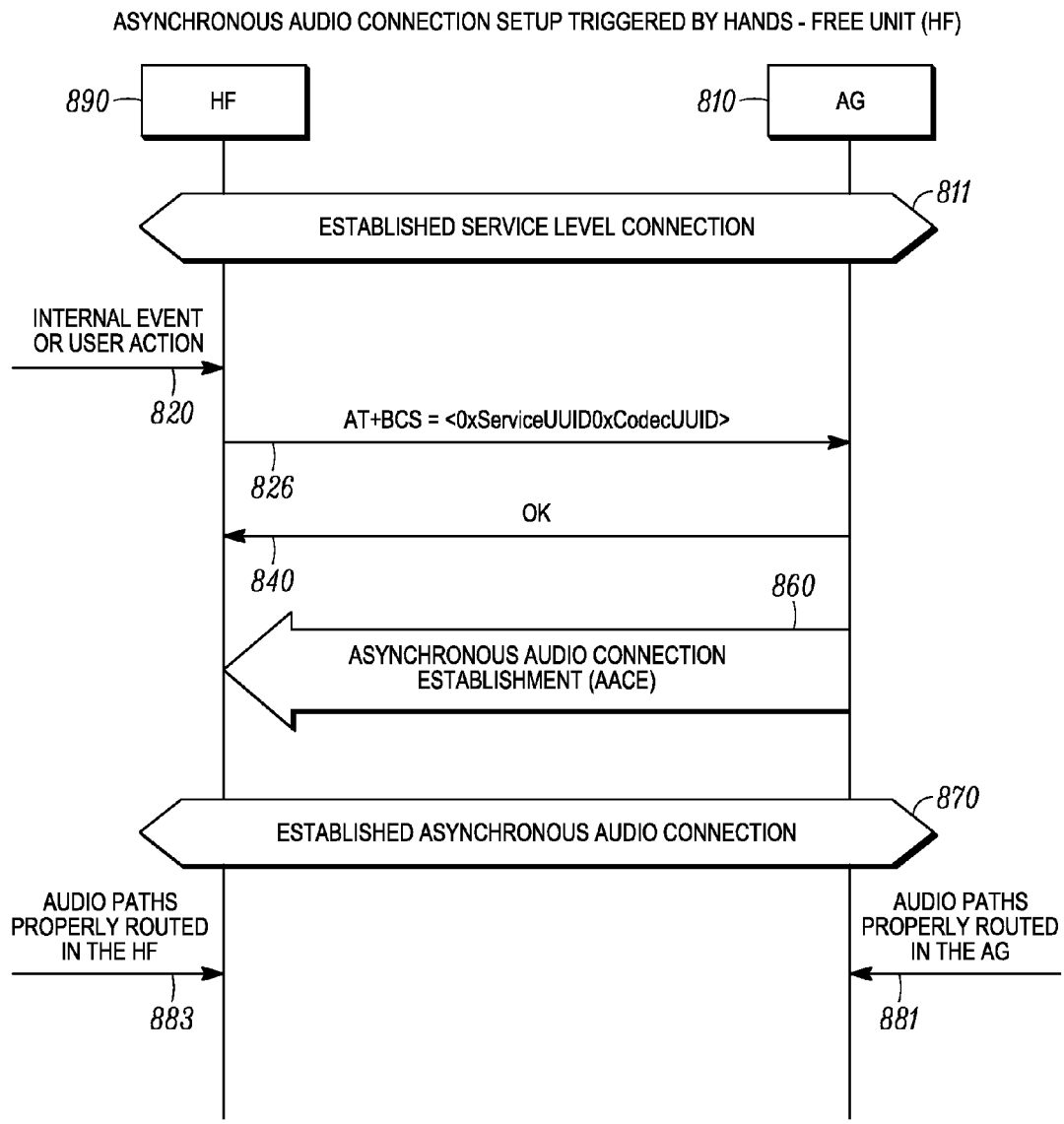
FIG. 8 shows a signal diagram of a connection set-up triggered by an HF for a Voice over ACL transport in accordance with an embodiment.

FIG. 8 shows a signal diagram 800 of a connection set-up triggered by an HP for a Voice over ACL transport in accordance with an embodiment. Wireless signals travel between an AG 810 such as a mobile phone with Bluetooth radio and an HF 890 such as a Bluetooth headset.

During Bluetooth service discovery 811, the AG 810 and HF 890 exchange their respective service records (such as the example service records 500, 600 shown in FIGS. 5-6). An internal event or user action trigger 820 at the HF causes the HF to select a service class and codec appropriate to the trigger 820. Triggers are implementation-specific, and an example trigger is pressing a button on the HF 890 to place a hands-free VoIP phone call.

The HF 890 sends the selected service class UUID and codec UUID in an AT+BSCS message 826 which can be implemented using one or more AT commands. Assuming that the AG supports a matching service class and a matching codec (which it should, because of the earlier-exchanged service records during service discovery 811), the AG responds with an OK message 840 to the HF 890.

Next, the AG initiates an asynchronous audio connection establishment (AACE) 860. Both the AG 810 and the HF 890 use the selected service class and selected codec to establish their respective audio paths. (See FIG. 2.) When the audio paths are set up at the AG 810 and HF 890, the asynchronous audio connection is established 870 and audio paths are properly routed in the HF 883 and in the AG 881. Thus, a full-duplex, wideband, asynchronous audio connection can be set up and established as triggered by an HF 890.

Figure 9:
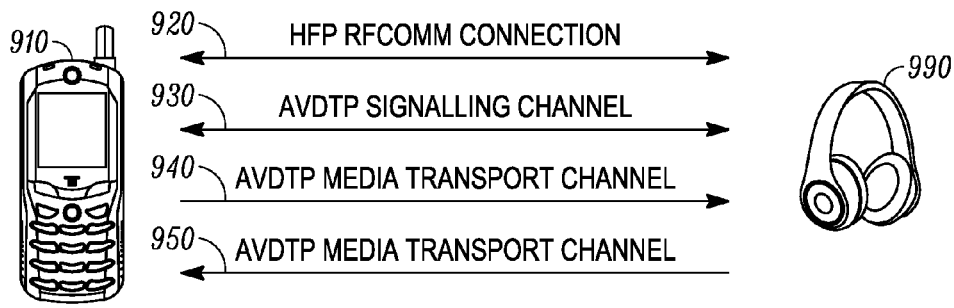
FIG. 9 shows a schematic diagram of Voice over AVDTP channels established to support a full-duplex, high bandwidth, asynchronous audio Bluetooth connection in accordance with an embodiment.

FIG. 9 shows a schematic diagram 900 of Voice over AVDTP channels established to support a full-duplex, wideband, asynchronous audio connection in accordance with an embodiment. An RFCOMM connection 920 provides a transport for the service level connections 711, 811 shown in FIGS. 7-8. If the selected service class is VoAVDTP, asynchronous audio connection establishment (see FIGS. 3-4 and 7-8 elements 360, 460, 760, 860) opens an L2CAP signaling channel 930 between the AG and the HF, executes an AVDTP signaling procedure that configures and opens two L2CAP media transport channels 940, 950 between the AG 910 and HF 990, and properly routes the audio paths on both the AG 910 and HF 980.

Because the AVDTP connection supports only a one-way wideband channel, two AVDTP media transport channels are used to support a full-duplex wideband audio signal.

Figure 10:
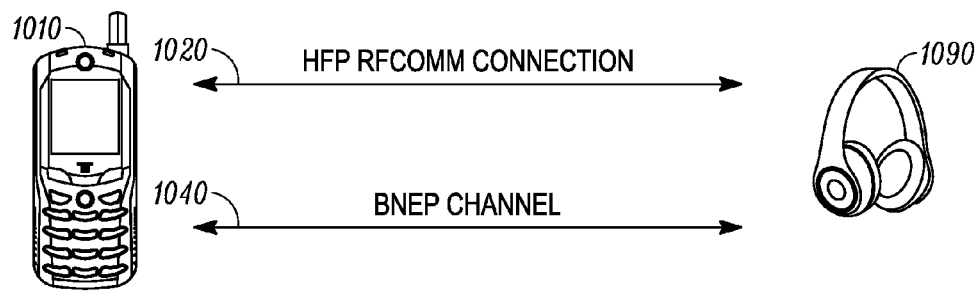
FIG. 10 shows a schematic diagram of Voice over BNEP channels established to support a full-duplex, high bandwidth, asynchronous audio Bluetooth connection in accordance with an embodiment.

FIG. 10 shows a schematic diagram 1000 of Voice over BNEP channels established to support a full-duplex, high bandwidth, asynchronous audio connection in accordance with an embodiment. An RFCOMM connection 1020 provides a transport for the service level connection 711, 811 shown in FIGS. 7-8. If the selected service class is VoBNEP, asynchronous audio connection establishment (see FIGS. 3-4 and 7-8 elements 360, 460, 760, 860) sets up a personal area network that includes both the AG 1010 and the HF 1090 using the Bluetooth Personal Area Networking Profile (PAN) and properly assigns IP addresses to both the AG and HF. Next, either the AG 1010 or HF 1090 opens an application-level VoIP connection between the AG 1010 and HF 1090 and properly routes the audio paths on both the AG and HF over a BNEP channel 1040.

In accordance with the Bluetooth Personal Area Networking Profile (PAN), one of the devices assumes the role of Group Ad-hoc Network (GN) (or Network Access Point (NAP)) and initializes its GN (or NAP) service connection. The other device then assumes the role of Personal Area Network User (PANU) and then establishes a GN (or NAP) service connection with the GN (or NAP). In some cases, one of the devices may already be acting as a GN (or NAP) in an existing personal area network; in this case there is no need to initialize the GN (or NAP) service again.

Because the BNFP connection supports a point-to-multipoint wideband channel, only one BNFP transport channel is needed to support a full-duplex wideband audio signal. VoBNEF is particularly useful for point-to-multipoint (P2M) situations (because BNEP can support P2M connections) and also in VoIP situations (because of existing similarities between BNEP and Internet Protocol).

Thus, depending on the application trigger, available service classes and codecs at the AG, and available service classes at the HF, a full-duplex audio connection can be set up and established over an asynchronous Bluetooth link. For non-IP audio applications, an ACL using AVDTP may be selected; for IP audio applications, an ACL using BNEP may be selected. Both AVDTP and BNEP have an advantage of being able to use codecs that support wide bandwidth audio, while the traditional CVSD only supports narrow bandwidth audio. Additionally, by providing alternatives to Bluetooth SCO, a full-duplex audio Bluetooth connection may be able to better coexist with another technology's synchronous connection.

While this disclosure includes what are considered presently to be the embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, a processor executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

We claim:

1. A method for an audio terminal to establish a full-duplex audio connection over an asynchronous Bluetooth link with a wireless audio device comprising:
   exchanging supported service classes and codecs between the audio terminal and the wireless audio device;
   negotiating a service class and a codec that are common to the audio terminal and the wireless audio device based on the supported service classes and codecs; and
   establishing an asynchronous audio connection between the audio terminal and the wireless audio device using the service class and the codec.

2. The method according to claim 1 wherein the exchanging supported service classes and codecs comprises:
   transmitting an audio gateway service record from the audio terminal; and
   receiving a hand-free unit service record from the wireless audio device.

3. The method according to claim 1 wherein the exchanging supported service classes and codecs comprises:
   receiving a transport service class identifier and a codec identifier.

4. The method according to claim 3 wherein the negotiating comprises:
   sending an acknowledgement message to the wireless audio device, if the transport service class identifier corresponds to an audio terminal service class available at the audio terminal and the codec identifier corresponds to an audio terminal codec available at the audio terminal.

5. The method according to claim 3 further comprising:
   sending an error message to the wireless audio device, if the transport service class identifier fails to correspond to an audio terminal service class available at the audio terminal; and
   re-performing the exchanging step.

6. The method according to claim 3 further comprising:
   sending an error message to the wireless audio device, if the codec identifier fails to correspond to an audio gateway codec available at the audio terminal; and
   re-performing the exchanging step.

7. The method according to claim 1 wherein the service class is Voice over Audio/Video Distribution Transport Protocol.

8. The method according to claim 7 wherein the establishing comprises:
   creating a Hands-Free Profile Radio Frequency Communication protocol connection;
   opening an Audio/Video Distribution Transport Protocol signaling channel; and
   configuring a first Audio/Video Distribution Transport Protocol media transport channel between the audio terminal and the wireless audio device.

9. The method according to claim 8 further comprising:
   configuring a second Audio/Video Distribution Transport Protocol media transport channel between the wireless audio device and the audio terminal.

10. The method according to claim 1 wherein the service class is Voice over Bluetooth Network Encapsulation Protocol.

11. The method according to claim 10 wherein establishing comprises:
    creating a Hands-Free Profile Radio Frequency Communication protocol connection;
    establishing a Bluetooth Network Encapsulation Protocol link between the wireless audio device and the audio terminal.

12. The method according to claim 1 further comprising:
    receiving a trigger at the audio terminal requesting establishment of a full-duplex audio connection over an asynchronous Bluetooth link with the wireless audio device.

13. The method according to claim 12 further comprising:
    selecting a codec, after the exchanging step.

14. The method according to claim 13 further comprising:
    selecting a service class, after the exchanging step.

15. The method according to claim 14 further comprising:
    transmitting a service class identifier corresponding to the service class.

16. The method according to claim 14 further comprising:
    transmitting a service class identifier corresponding to the service class; and
    transmitting a codec identifier corresponding to the codec.

17. A method for a hands-free unit to establish a full-duplex audio connection over an asynchronous Bluetooth link with an audio gateway comprising:
    transmitting information regarding hands-free unit supported service classes and codecs;
    receiving information regarding audio gateway supported service classes and codecs from an audio gateway;
    selecting a hands-free unit service class and a hands-free unit codec based on the information regarding hands-free unit supported service classes and codecs and the information regarding audio gateway supported service classes and codecs;
    transmitting a hands-free unit service class identifier corresponding to the hands-free unit service class and a hands-free unit codec identifier corresponding to the hands-free unit codec;
    receiving an acknowledgement message from the audio gateway; and establishing an asynchronous audio connection with the audio gateway using the hands-free unit service class and the hands-free unit codec.

18. The method according to claim 17 wherein the service class is Voice over Audio/Video Distribution Transport Protocol.

19. The method according to claim 17 wherein the service class is Voice over Bluetooth Network Encapsulation Protocol.

20. The method according to claim 17 further comprising: re-performing service discovery if an error message is received.

21. The method according to claim 17 further comprising: re-performing service discovery if no acknowledgement message is received during a timeout period.

* * * * *